(12) United States Patent
Motoki

(10) Patent No.: US 10,554,042 B2
(45) Date of Patent: Feb. 4, 2020

(54) POWER SUPPLY APPARATUS

(71) Applicant: ROHM CO., LTD., Ukyo-Ku, Kyoto (JP)

(72) Inventor: Kenichi Motoki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 359 days.

(21) Appl. No.: 15/465,121

(22) Filed: Mar. 21, 2017

(65) Prior Publication Data

US 2017/0279270 A1 Sep. 28, 2017

(30) Foreign Application Priority Data

Mar. 23, 2016 (JP) .................. 2016-059183

(51) Int. Cl.
| | |
|---|---|
| *H01B 11/02* | (2006.01) |
| *H02J 1/00* | (2006.01) |
| *H02J 7/00* | (2006.01) |
| *H02M 3/04* | (2006.01) |
| *H02M 7/04* | (2006.01) |

(52) U.S. Cl.
CPC .............. *H02J 1/00* (2013.01); *H01B 11/02* (2013.01); *H02J 7/0052* (2013.01); *H02M 3/04* (2013.01); *H02M 7/04* (2013.01)

(58) Field of Classification Search
USPC ......................................... 307/104
See application file for complete search history.

(56) References Cited

U.S. PATENT DOCUMENTS

| | | | |
|---|---|---|---|
| 9,541,975 B2 * | 1/2017 | Ukai | ............... G06F 1/26 |
| 2017/0185126 A1 * | 6/2017 | Trethewey | ............. H02J 7/025 |

FOREIGN PATENT DOCUMENTS

| | | |
|---|---|---|
| JP | 2006060977 A | 3/2006 |
| JP | 2006304500 A | 11/2006 |
| JP | 2013198262 * | 3/2013 |
| JP | 2013198262 A | 9/2013 |

* cited by examiner

*Primary Examiner* — Rexford N Barnie
*Assistant Examiner* — Xuan Ly
(74) *Attorney, Agent, or Firm* — Cantor Colburn LLP

(57) ABSTRACT

A power supply apparatus requests the transmission of a requested PDO. A power receiving apparatus transmits the requested PDO in response to the request. The power supply apparatus modifies a first PDO list based on the requested PDO when it is possible to do so. The first PDO list is modified when the requested voltage is not defined in the first PDO list in a case in which a power supply circuit of the power supply apparatus is capable of supplying the request voltage indicated by the requested PDO. Subsequently, negotiation is performed based on the first PDO list thus modified.

10 Claims, 7 Drawing Sheets

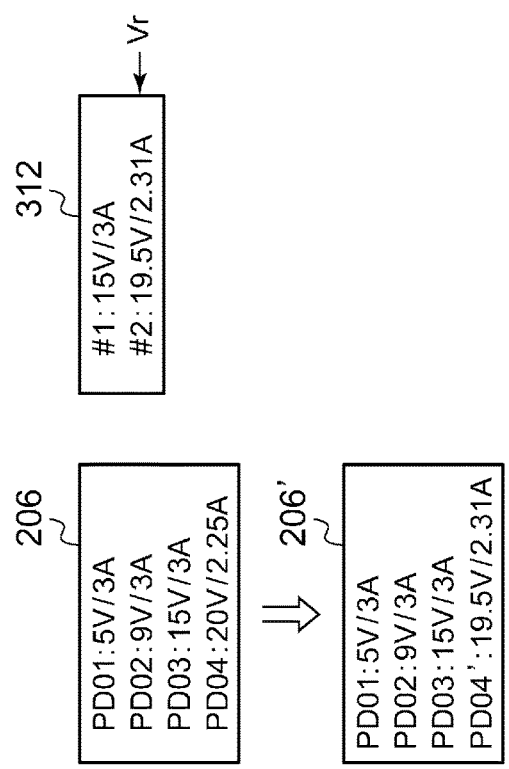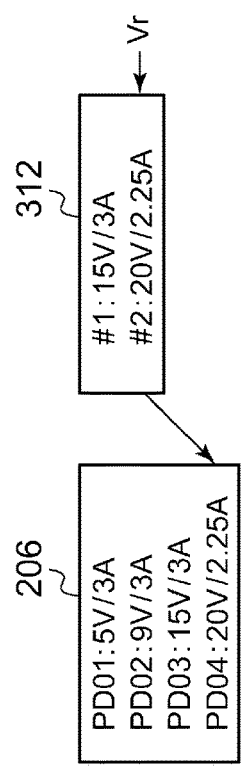

500

600

POWER SUPPLY APPARATUS

CROSS-REFERENCE TO RELATED APPLICATIONS

This application is based upon and claims the benefit of priority from the prior Japanese Patent Application No. 2016-059183, filed Mar. 23, 2016; the entire contents of which are incorporated herein by reference.

BACKGROUND OF THE INVENTION

1. Field of the Invention

The present invention relates to a power supply technique for an electronic device.

2. Description of the Related Art

Battery-driven devices such as cellular phone terminals, tablet terminals, laptop computers, and portable audio players each include a rechargeable secondary battery and a charger circuit that charges the secondary battery as built-in components. Known examples of such charger circuits include: an arrangement that charges a secondary battery using a DC voltage (bus voltage $V_{BUS}$) supplied from an external circuit via a USB cable; and an arrangement in which the secondary battery is charged using the DC voltage supplied from an external AC adapter.

At present, as a charger circuit mounted on a mobile device, charger circuits that conform to a specification which is referred to as the "USB Battery Charging Specification" (which will be referred to as the "BC specification" hereafter) have become mainstream. There are several kinds of USB hosts or USB chargers (which will collectively be referred to as a "USB power supply apparatus" hereafter). As the kinds of USB power supply apparatuses that conform to revision 1.2 of the BC specification, SDP (Standard Downstream Port), DCP (Dedicated Charging Port), and CDP (Charging Downstream Port) have been defined. The current (current capacity) that can be provided by a USB power supply apparatus is determined according to the kind of USB power supply apparatus. Specifically, DCP and CDP are defined to provide a current capacity of 1500 mA. Also, SDP is defined to provide a current capacity of 100 mA, 500 mA, or 900 mA, according to the USB version.

As a next-generation secondary battery charging method or system using USB, a specification which is referred to as the "USB Power Delivery Specification" (which will be referred to as the "PD specification" hereafter) has been developed. The PD specification allows the available power to be dramatically increased up to a maximum of 100 W, as compared with the BC standard, which provides a power capacity of 7.5 W. Specifically, the PD specification allows a USB bus voltage that is higher than 5 V (specifically, 9 V, 12 V, 15 V, 20 V, or the like). Furthermore, the PD specification allows a charging current that is greater than that defined by the BC specification (specifically, the PD specification allows a charging current of 2 A, 3 A, 5 A, or the like). The PD specification is also defined in the USB Type-C specification.

FIG. 1 is a block diagram showing a power supply system 100R investigated by the present inventor. The power supply system 100R conforms to the USB Type-C specification, and includes a power supply apparatus 200R and a power receiving apparatus 300R coupled via a USB cable 106. For example, the power supply apparatus 200R is mounted on an AC adapter 102, or is mounted on an electronic device. The power receiving apparatus 300R is mounted on a battery-driven electronic device 400 such as a smartphone, a tablet terminal, a digital still cameral, a digital video camera, a portable audio player, or the like.

The power supply apparatus 200R includes a power supply circuit 202 and a power supply side PD controller (which will be referred to as the "power supply side controller" hereafter) 204. A SOURCE PDO (Power Data Object) list or table (which will also be referred to simply as the "PDO list" hereafter) 206 is capable of holding a maximum of seven defined combinations (PDOs) of the voltage and current that can be supplied by the power supply apparatus 200R.

The USB cable 106 is detachably coupled to a receptacle 108 of the electronic device 400. It should be noted that such a receptacle 108 may be omitted. That is to say, charger adapters are known having a configuration in which the USB cable 106 and the AC adapter 102 are monolithically integrated.

The receptacle 108 includes a VBUS terminal configured to supply a bus voltage $V_{BUS}$, a GND terminal configured to supply a ground voltage $V_{GND}$, and a CC (Configuration Channel) terminal. With receptacle-type terminals, two CC terminals are provided. However, in the present embodiment, one terminal is omitted for simplicity of description. The power supply circuit 202 generates the bus voltage $V_{BUS}$. The power supply circuit 202 may include an AC/DC converter that receives an AC voltage of 100 V from an unshown external power supply (e.g., a commercially available AC power supply), and that converts the AC voltage thus received into the bus voltage $V_{BUS}$ in the form of a DC voltage. The bus voltage $V_{BUS}$ generated by the power supply circuit 202 is supplied to the power receiving apparatus 300R via a bus line of the USB cable 106.

The power supply side controller 204 is coupled to a power receiving side PD controller (which will be referred to as the "receiving side controller" hereafter) 306 via the USB cable 106. The power supply side controller 204 and the power receiving side controller 310 provide a communication function that allows communication between the power supply apparatus 200R and the power receiving apparatus 300R.

The electronic device 400 incudes a load (system) 402 in addition to the power supply apparatus 300R. Examples of such a load 402 include CPUs, memory, liquid crystal displays, audio circuits, and the like. The AC adapter 102 is detachably coupled to the receptacle 404 via the USB cable 106.

The power receiving apparatus 300R includes a battery 302, a charger circuit 304, a power supply circuit 306, a DC/DC converter 308, a power receiving side controller 310, and a SINK PDO list or table (which will also be referred to simply as the "PDO list" hereafter) 312.

The battery 302 is a rechargeable secondary battery. The charger circuit 304 receives the bus voltage $V_{BUS}$ (which will also be referred to as the "adapter voltage $V_{ADP}$" on the power receiving apparatus 300R side) from the power supply apparatus 200R via the USB cable 106, so as to charge the battery 302. The charger circuit 304 is configured as a step-down DC/DC converter, a linear regulator, or a combination of such components.

A system voltage $V_{SYS}$ is supplied from the charger circuit 304 to the load 402 according to at least one of the adapter voltage $V_{ADP}$ and the voltage $V_{BAT}$ supplied from the battery 302. Examples of such a load 402 include power management ICs (Integrated Circuits), multi-channel power supplies each including a DC/DC converter, linear regulator or the like, microcomputers, liquid crystal displays, display drivers, and so forth.

A load 402 operates with a system voltage $V_{SYS}$ of 20 V and a maximum current of 2.25 A (with an electric power of 45 W), for example. Also, the electronic device 400 supports a bus voltage $V_{BUS}$ of 15 V in addition to a bus voltage $V_{BUS}$ of 20 V. In the PDO list 312, combinations of the voltage and the current to be requested by the electronic device 400 are each defined as a PDO. In this example, a combination of 20 V and 2.25 A and a combination of 15 V and 3 A are each defined as a PDO. Furthermore, in the USB-PD specification, the power supply side and the power receiving side are both required to support a voltage of 5 V (without a definition of the current).

In order to satisfy such a request, the power supply circuit 306 is provided as an upstream stage of the charger circuit 304. The power supply circuit 306 includes the DC/DC converter 308. In a case in which $V_{BUS}$=15 V, the DC/DC converter 308 steps up the bus voltage $V_{BUS}$ so as to generate an adapter voltage $V_{ADP}$ of 20 V.

The power receiving controller 310 is configured as a port controller that conforms to the USB Type-C specification. The power receiving controller 310 is coupled to the power supply side controller 204 via a CC line. After the AC adapter 102 and the electronic device 400 are coupled, negotiation is performed between the power supply side controller 204 and the power receiving side controller 310. As a result, the voltage level of the bus voltage $V_{BUS}$ is determined based on the PDO list 206 and the PDO list 312.

FIG. 2 is a sequence diagram showing a negotiation operation that conforms to the USB-PD specification shown in FIG. 1. First, the power supply side controller 204 transmits the PDO list 206 to the power receiving side controller 310, so as to declare the voltage/current combinations that can be supplied (which will be referred to as "Source Capability") (S100).

The power receiving side controller 310 refers to the PDO list 312, and selects a single optimum PDO from the PDO list 206 (S102). Subsequently, the power receiving side controller 310 transmits an RDO (Request Data Object) including the selected PDO and the amount of current to be consumed (S104). If the amount of current that can be supplied from the power supply apparatus 200R is smaller than the amount of current requested by the power receiving apparatus 300R, the RDO includes information indicating that a mismatch has occurred between the source capability and the receiver request. That is to say, in this case, the power receiving apparatus 300R transmits, to the power supply apparatus 200R, a notice that only a suboptimal PDO has been selected based on the negotiation.

After the power supply side controller 204 receives the RDO, the power supply side controller 204 sets the output voltage $V_{BUS}$ of the power supply circuit 202 to a value indicated by the PDO (S106). It should be noted that the current requested by the PDO list 312 does not necessarily match the current values defined in the PDO list 206.

Description will be made regarding an example in which the power supply apparatus 200R supports four PDOs, i.e., PDO1 through PDO4 defined in the PDO list 206 shown in FIG. 1. Directing attention to the power receiving side apparatus 300R side, voltage conversion by means of the DC/DC converter 308 involves power loss. Accordingly, a bus voltage $V_{BUS}$ of 20 V is preferably selected, which allows the DC/DC converter 308 to operate with high efficiency. That is to say, the power receiving side controller 310 selects the PDO4, which indicates a combination of 20 V and 2.25 A, from the PDO list received in Step S100. Furthermore, the power receiving side controller 310 transmits an RDO including the PDO4 and the current value of 2.25 A to be consumed in the electronic device 400. In this case, the power supply system 100 operates effectively.

As a result of investigating such a power supply system 100R shown in FIG. 1, the present inventor has come to recognize the following problem.

The number of PDOs that can defined in the PDO list 206 is limited. Accordingly, it is not necessarily the case that all the voltage/current combinations that can be generated by the power supply circuit 202 are defined in the PDO list 206. In the example shown in FIG. 1, a situation is possible in which the PDO list 206 does not include the PDO4, although the power supply circuit 202 supports the voltage/current combination of 20V and 2.25 A.

In this case, the power receiving side controller 310 selects the PDO3 from among PDO1 through PDO3. As a result, there is a need to operate the DC/DC converter 308, leading to degraded efficiency.

Also, when the power receiving apparatus 300R requests the voltage/current combination of 19 V and 2.38 A (i.e., 45 W) instead of the voltage of 20 V, the power receiving side controller 310 selects the PDO3 even if the PDO list 206 includes the PDO4 (20 V/2.25 A). Such a case also leads to degraded efficiency.

In some cases, the power supply system 100R can become inoperable depending on the combination of the PDO list 206 and the PDO list 312, which is also a conceivable problem.

It should be noted that such a problem is not restricted to such a USB-PD specification, but can occur in various kinds of power supply systems employing similar protocols.

SUMMARY OF THE INVENTION

The present invention has been made in order to solve such a problem. Accordingly, it is an exemplary purpose of an embodiment of the present invention to provide a power supply system with improved efficiency or a power supply apparatus and a power supply method for allowing an inoperable state to be avoided.

An embodiment of the present invention relates to a power supply apparatus structured to supply a bus voltage to a power receiving apparatus. The power supply apparatus comprises: a power supply circuit structured to generate the bus voltage in the form of a variable voltage; a first list comprising data that defines an available voltage and an available current that can be provided by means of the power supply circuit; a power supply side controller structured to communicate and negotiate with a power receiving side controller of the power receiving apparatus, to determine a voltage value to be supplied by means of negotiation using the first list, and to instruct the power supply circuit to generate the bus voltage having the determined voltage value; and a list modifying unit structured to request, by using a communication function of the power supply side controller, the power receiving side controller to transmit data comprising a requested voltage value requested by the power receiving apparatus, and to modify the first list so as to include the requested voltage value when the requested voltage value is not defined in the first list in a case in which the power supply circuit is capable of supplying the bus voltage having the requested voltage value.

With such an embodiment, by modifying the first list held by the power supply apparatus such that it matches the power receiving apparatus, such an arrangement provides the power supply system with improved efficiency. Also, such an arrangement prevents the power supply system from entering an inoperable state.

Also, before the list modifying unit modifies the first list, the power supply side controller may perform a first negotiation operation with the power receiving side controller so as to determine the voltage value to be supplied. Also, after the completion of the first negotiation operation, the list modifying unit may request the power receiving apparatus to transmit data including the requested voltage value.

Also, the power supply apparatus may conform to the USB-PD specification. Examples of "such an arrangement that conforms to the USB-PD specification" include: an arrangement (compliant arrangement) that has passed a compliance test in conformance with the USB-PD specification; and an arrangement (compatible arrangement) that has not passed such a compliance test but that supports an operation according to the USB-PD specification.

Also, the power supply circuit may comprise a DC/DC converter structured so as to have a variable output voltage. Also, the power supply side controller may control the output voltage of the DC/DC converter.

Also, the power supply circuit may comprise multiple DC/DC converters. Also, the power supply side controller may select one from among the multiple DC/DC converters.

Also, the power supply circuit may comprise an AC/DC converter structured so as to have a variable output voltage. Also, the power supply side controller may control the output voltage of the AC/DC converter.

Another embodiment of the present invention relates to an AC adapter. The AC adapter may comprise any one of the aforementioned power supply apparatuses.

Yet another embodiment of the present invention relates to an electronic device. The electronic device may comprise any one of the aforementioned power supply apparatuses.

Yet another embodiment of the present invention relates to a control circuit for a power supply apparatus structured to supply a bus voltage to a power receiving apparatus. The power supply apparatus comprises a power supply circuit structured to generating a variable bus voltage, in addition to the control circuit. The control circuit comprises: memory structured to store a first list comprising data that defines an available voltage value and a available current value that can be supplied by the power supply circuit; a power supply side controller structured to communicate and negotiate with a power receiving side controller of the power receiving apparatus, to determine a voltage value to be supplied using the first list, and to instruct the power supply circuit to generate the bus voltage having the determined voltage value; and a list modifying unit structured to request, by using a communication function of the power supply side controller, the power receiving side controller to transmit data inducing a requested voltage value requested by the power receiving apparatus, and to modify the first list so as to include the requested voltage value when the requested voltage is not defined in the first list in a case in which the power supply circuit is capable of supplying the bus voltage having the requested voltage value.

Also, the control circuit may be monolithically integrated on a single semiconductor substrate. Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit on a single chip, such an arrangement allows the circuit area to be reduced, and allows the circuit elements to have uniform characteristics.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A and 5B are diagrams for explaining the modification of a first PDO list;

DETAILED DESCRIPTION OF THE INVENTION

Figure 1:
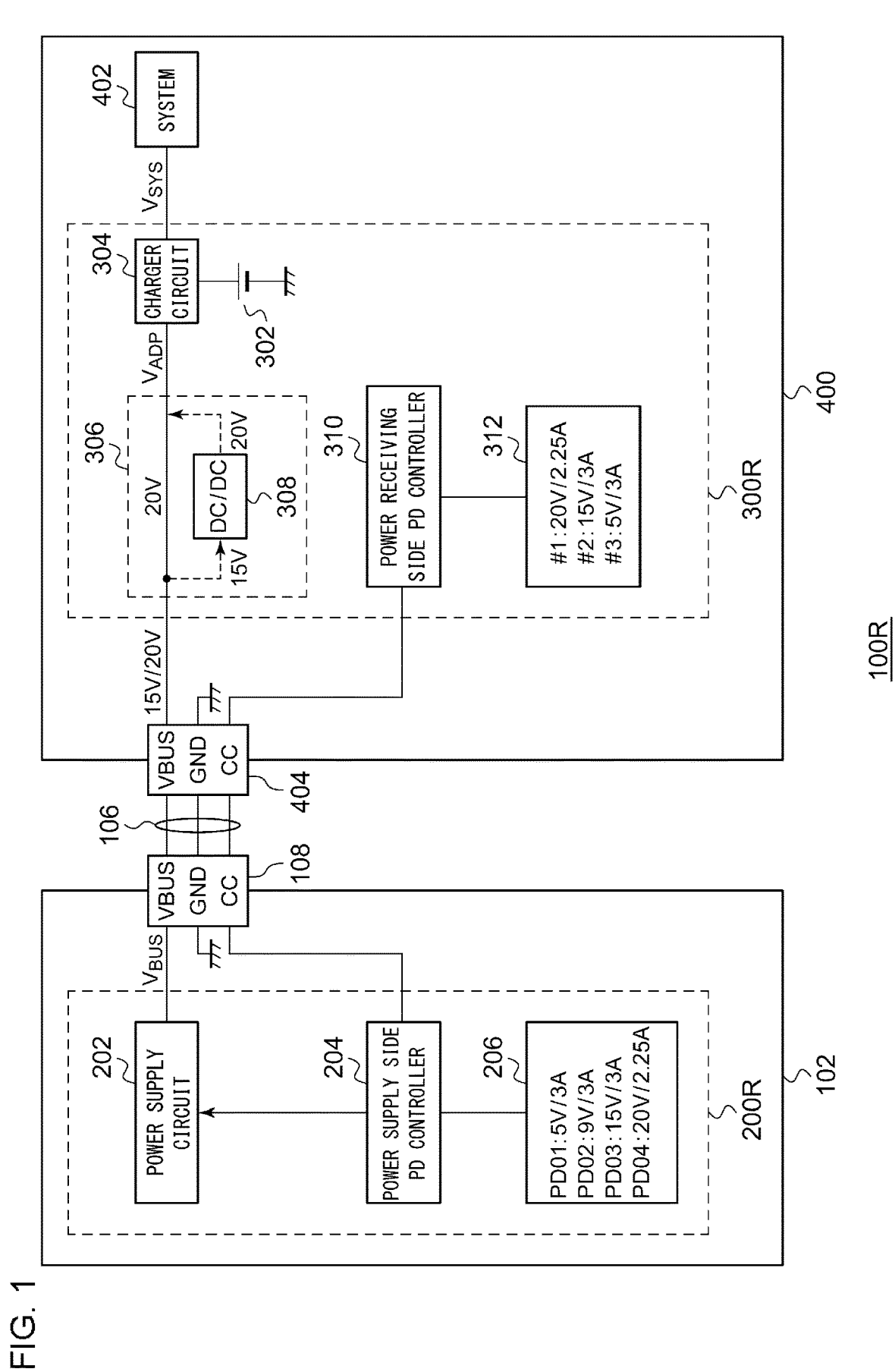
FIG. 1 is a block diagram showing a power supply system investigated by the present inventor.

The invention will now be described by reference to the preferred embodiments. This does not intend to limit the scope of the present invention, but to exemplify the invention.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection therebetween, or that does not damage the functions or effects of the connection therebetween, in addition to a state in which the member A is physically and directly coupled to the member B.

Similarly, the state represented by the phrase "the member C is provided between the member A and the member B" includes a state in which the member A is indirectly coupled to the member C, or the member B is indirectly coupled to the member C via another member that does not substantially affect the electric connection therebetween, or that does not damage the functions or effects of the connection therebetween, in addition to a state in which the member A is directly coupled to the member C, or the member B is directly coupled to the member C.

Figure 3:
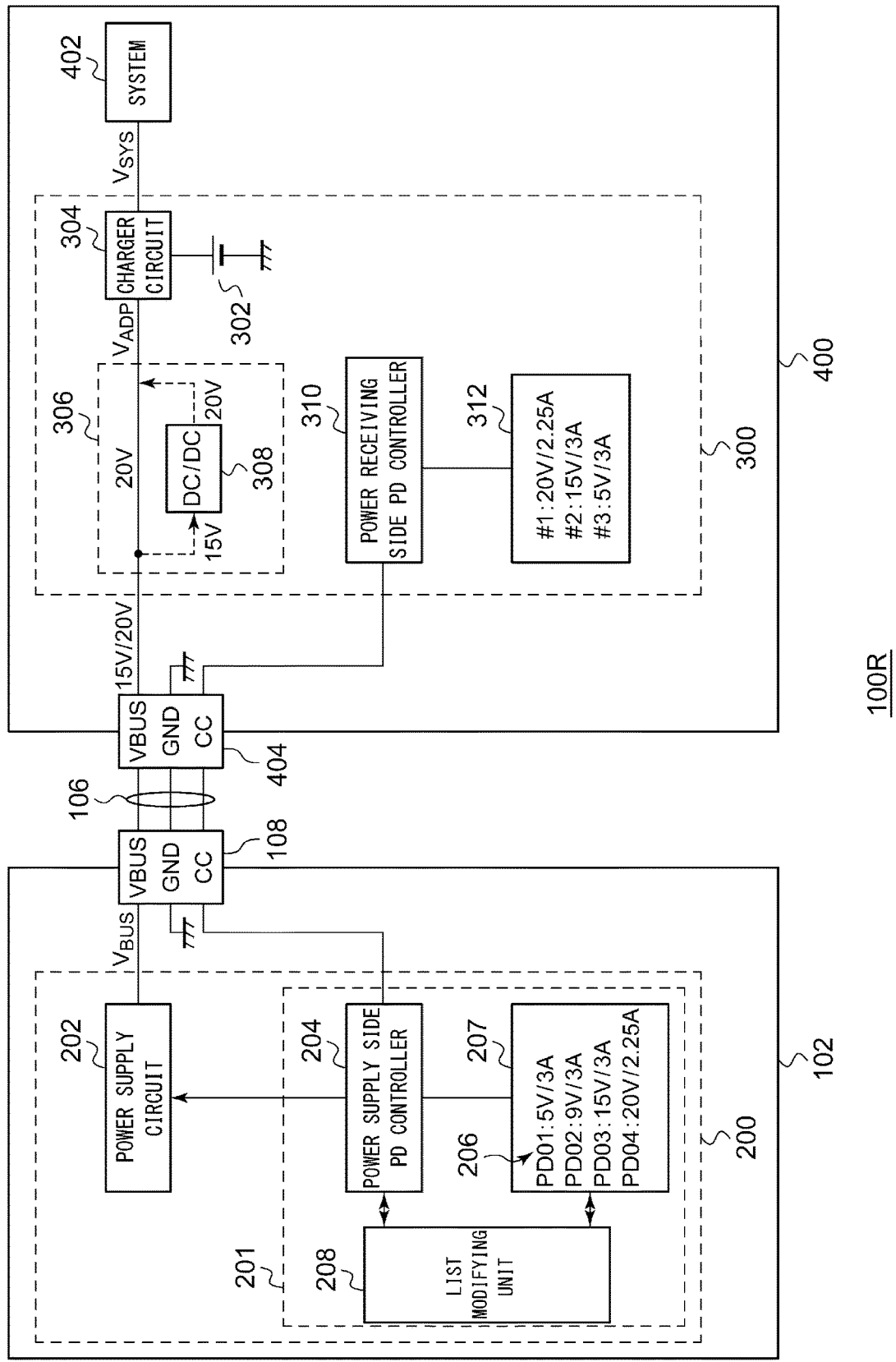
FIG. 3 is a block diagram showing a power supply system according to an embodiment.

FIG. 3 is a block diagram showing a power supply system 100 according to an embodiment. As with the configuration shown in FIG. 1, the power supply system 100 conforms to the USB Type-C specification, and includes a power supply apparatus 200 and a power receiving apparatus 300 coupled via a USB cable 106. For example, the power supply apparatus 200 is mounted on an AC adapter 102 or is mounted on an electronic device. The power supply apparatus 300 is mounted on a battery-driven electronic device 400 such as a smartphone, a tablet terminal, a digital still camera, a digital video camera, a portable audio player, or the like.

The power supply apparatus 200 includes a power supply circuit 202 that is capable of generating a variable bus voltage $V_{BUS}$ and a control circuit 201. The control circuit 201 includes a power supply side PD controller (which will be referred to as the "power supply side controller" hereafter) 204, memory that stores a first PDO list 206, and a list modifying unit 208. The control circuit 201 may be configured as a function IC monolithically integrated on a single semiconductor substrate. The power supply circuit 202, the power supply side controller 204, and the PDO list 206 each have the same configuration as described above with reference to FIG. 1. The PDO list 206 is stored in the memory.

The first PDO list 206 includes at least one data item (PDO) that defines a combination of an available voltage value and an available current value that can be supplied by means of the power supply circuit 202. The power supply side controller 204 is capable of communicating with a power receiving side controller 310 included in the power receiving apparatus 300. The power supply side controller 204 determines the voltage value to be supplied based on negotiation with the power receiving side controller 310 using the first PDO list 206. The power supply side controller 204 instructs the power supply circuit 202 to generate the supply voltage having the determined value.

The list modifying unit 208 requests the power receiving side controller 310 to transmit data (a requested PDO) including the voltage value requested by the power receiving apparatus 300 using the communication function of the power supply side controller 204. Under the USB-PD specification, the "get Sink capability" message makes it possible to request the transmission of such a requested PDO.

The PDO list (second PDO list) 312 of the power receiving apparatus 300 side includes two requested voltage values 20 V and 15 V. The power receiving side controller 310 selects the voltage value of 20 V, which is a preferable value (typically, a higher voltage is selected, but other criteria may be employed). Furthermore, the power receiving side controller 310 transmits the corresponding PDO as the requested PDO to the power supply side controller 204.

When the requested voltage value (20 V) indicated by the requested PDO is not defined in the first PDO list 206 in a case in which the power supply circuit 202 is capable of supplying the requested voltage (20 V), the list modifying unit 208 modifies the first PDO list 206 such that it includes the requested voltage value (20 V).

Figure 2:
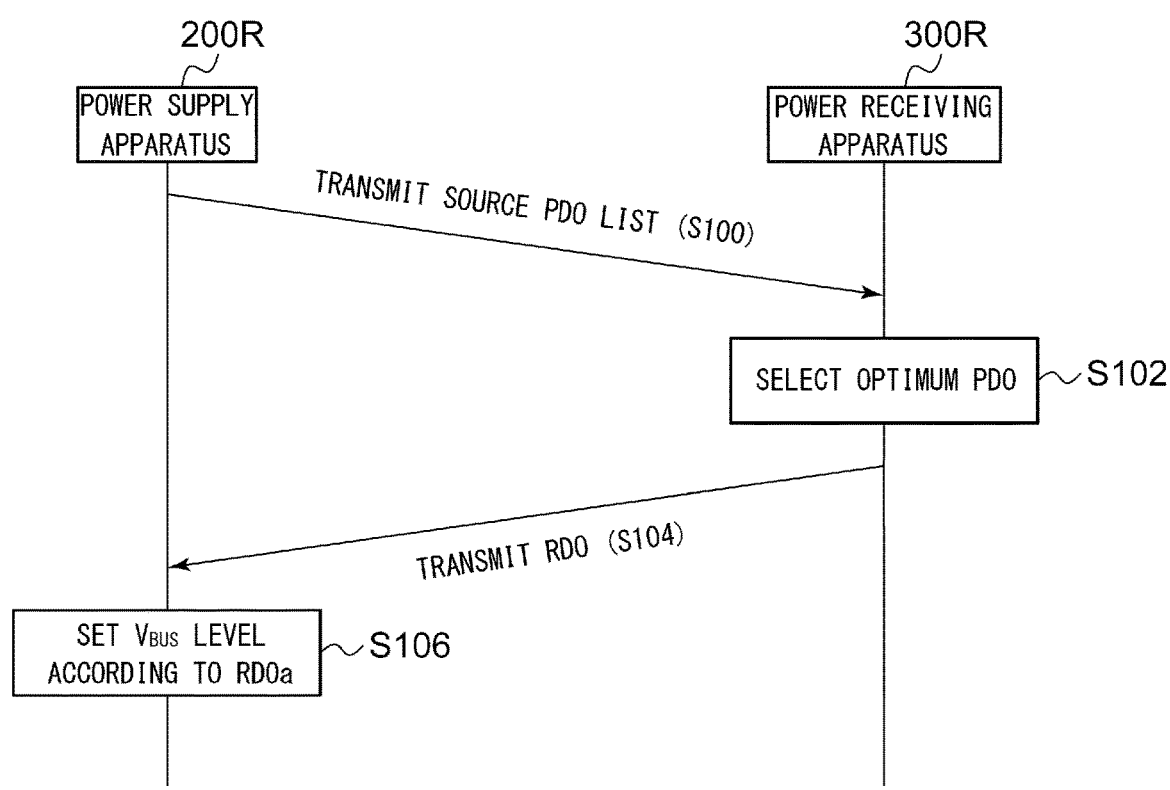
FIG. 2 is a sequence diagram showing a negotiation operation that conforms to the USB-PD specification shown in FIG. 1.

Preferably, the power supply side controller 204 performs an ordinary negotiation, i.e., the first negotiation, with the power receiving side controller 310 before the list modifying unit 208 modifies the first PDO list 206, i.e., before the "get Sink capability" message is transmitted, so as to determine the voltage value to be supplied. The power supply circuit 202 supplies the bus voltage $V_{BUS}$ according to the determination result. This operation is the same as described above with reference to FIG. 2. Subsequently, after the completion of the first negotiation, the list modifying unit 208 requests the power receiving apparatus 300 to transmit the requested PDO including the voltage value.

The above is the configuration of the power supply apparatus 200. Next, description will be made regarding the operation thereof.

Figure 4:
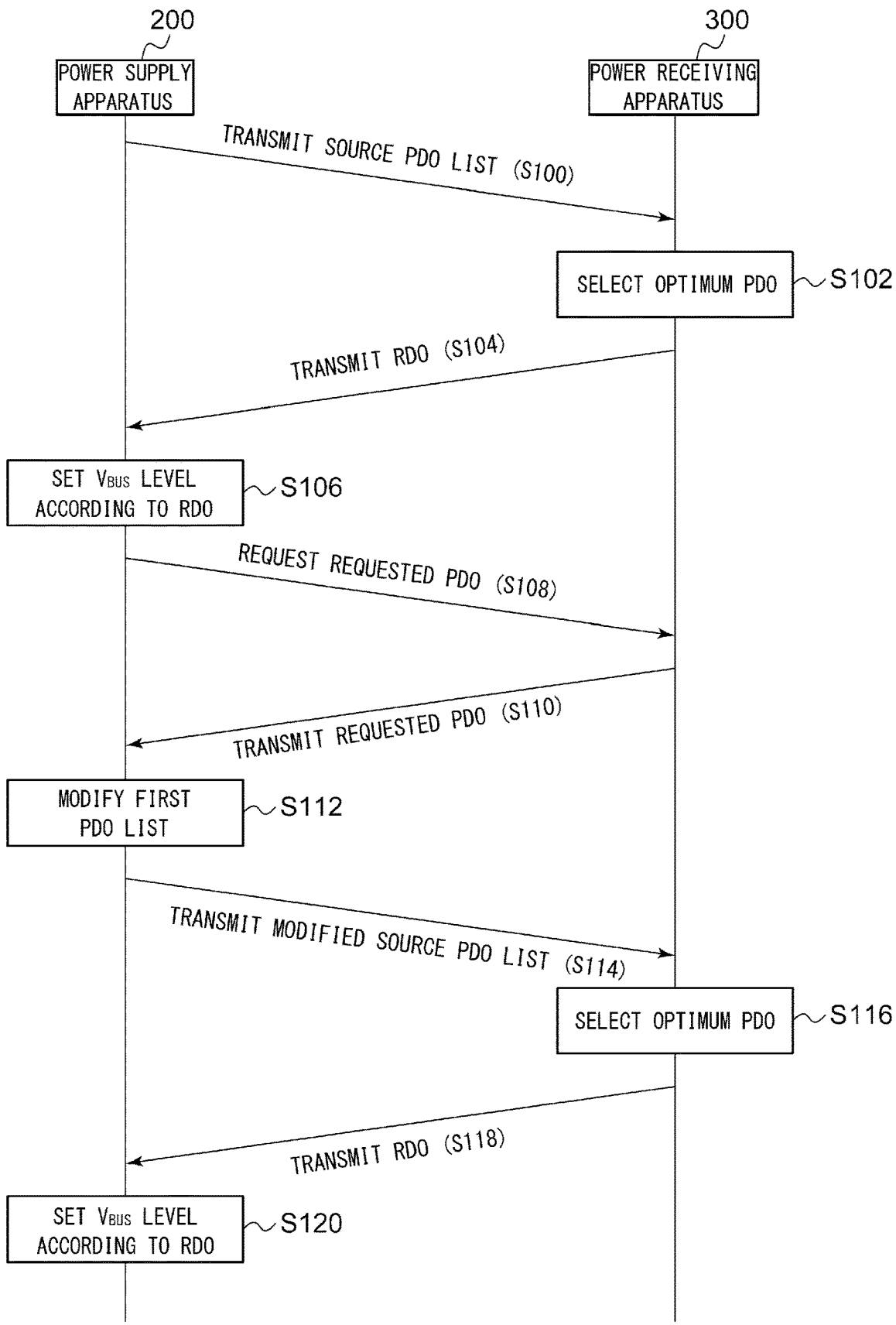
FIG. 4 is a sequence diagram showing a negotiation operation of the power supply system shown in FIG. 3.

FIG. 4 is a sequence diagram showing a negotiation operation of the power supply system 100 shown in FIG. 3. The sequence includes typical negotiation steps S100 through S106, which are the same as described with reference to FIG. 2. Next, the power supply apparatus 200 requests a requested PDO (S108). The power receiving apparatus 300 transmits the requested PDO in response to the request thus received (S110). The power supply apparatus 200 modifies the first PDO list 206 based on the requested PDO when it is possible (S112).

After the first PDO list 206 is modified, a negotiation operation (S114 through S120) is performed, which corresponds to Steps S110 through S106. Specifically, the power supply apparatus 200 transmits the modified first PDO list 206 to the power receiving apparatus 300 (S114). The power receiving apparatus 300 selects an optimum PDO based on the modified first PDO list (S116). Furthermore, the power receiving apparatus 300 transmits an RDO as a return value (S118). The power supply apparatus 200 sets, based on the RDO, the voltage level of the bus voltage $V_{BUS}$ to be generated by the power supply circuit 202 (S120).

It should be noted that, when modification of the first PDO list is impossible in Step S112, the operation is terminated in this step.

The above is the operation of the power supply system 100. Further detailed description will be made regarding the operation of the power supply system 100 with reference to specific values.

FIGS. 5A and 5B are diagrams for explaining the modification of the first PDO list. In an example shown in FIG. 5A, the requested voltage Vr is 20 V. In this example, the voltage of 20 V is defined in the first PDO list 206. In this case, the first PDO list is not modified. Thus, the voltage of 20 V is selected as a result of the first negotiation operation.

In an example shown in FIG. 5B, the first PDO list 206 is the same as that shown in FIG. 5A. However, the requested voltage Vr is 19.5 V, which differs from that shown in FIG. 5A. In this case, in the first negotiation, the voltage/current combination of 15 V and 3 A is selected. Subsequently, the first PDO list 206 is modified such that it includes the requested voltage value Vr=19.5 V, thereby generating the modified first PDO list 206'. In a case in which the allowable electric power of the power supply circuit 202 is $P_{MAX}$, the current defined in the modified PDO4 may be determined based on the Expression $I=P_{MAX}/Vr$.

After the modification of the first PDO list, the PDO4' (19.5V/2.31 A) is selected from the first PDO list 206' thus modified via the next negotiation. Thus, such an arrangement allows the power receiving apparatus 300 to operate in an optimum state (with high efficiency).

As described above, the power supply apparatus 200 according to the embodiment may be combined with various kinds of power receiving apparatuses 300, which allows an optimum bus voltage $V_{BUS}$ to be supplied.

FIGS. 6A through 6D are block diagrams each showing an example configuration of the power supply circuit 202. The power supply circuit 202 shown in FIG. 6A includes an AC/DC converter 202a having a variable output. The AC/DC converter 202a rectifies and smoothes an AC voltage. Furthermore, an insulation converter steps down the voltage thus rectified and smoothed, thereby generating a DC bus voltage $V_{BUS}$. The insulation converter includes a variable output. The power supply side controller 204 controls the output voltage of the AC/DC converter 202a so as to obtain the requested voltage.

Figure 6B:
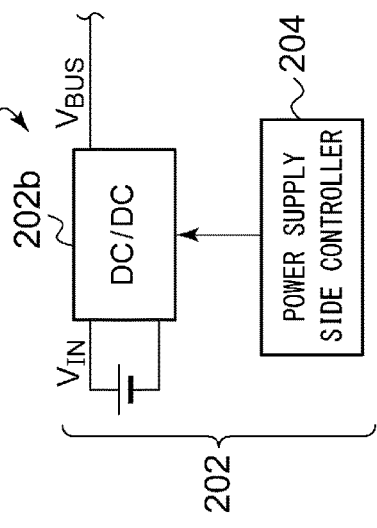
FIGS. 6A through 6D are block diagrams each showing an example configuration of a power supply circuit.

The power supply circuit 202 shown in FIG. 6B includes a DC/DC converter 202b having a variable output. The DC/DC converter 202b receives, as an input voltage, a DC voltage $V_{IN}$ supplied from a battery or otherwise generated by an unshown different DC/DC converter or AC/DC converter. The power supply side controller 204 controls the output voltage of the DC/DC converter 202b so as to obtain the requested voltage.

Figure 6D:
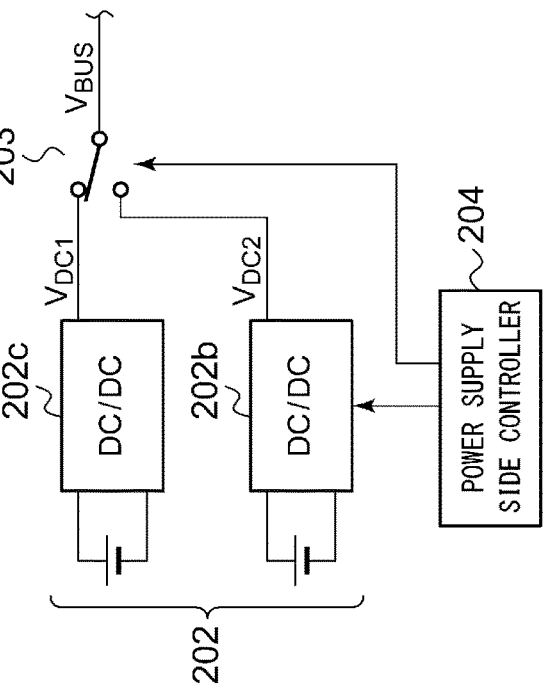
Figure 6A:
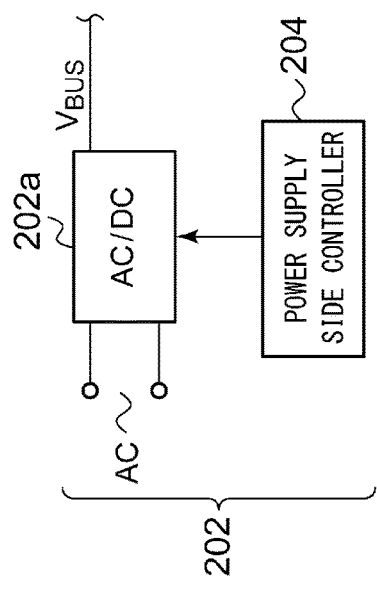
Figure 6C:
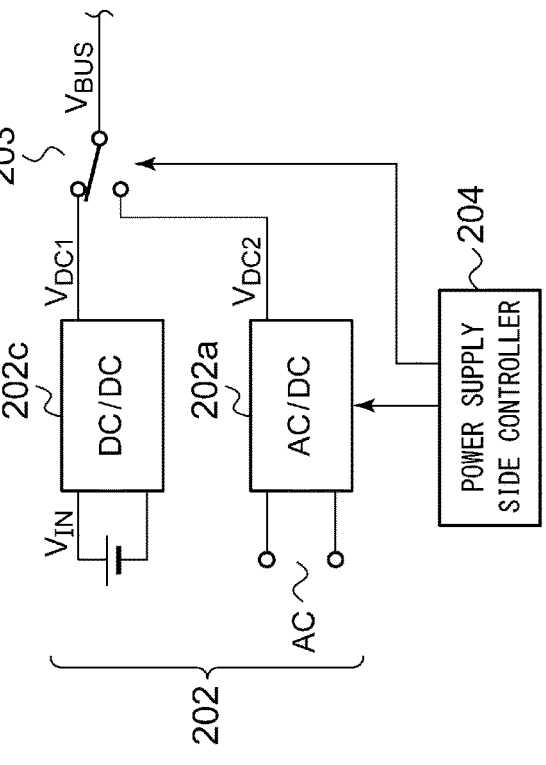

The power supply circuit 202 shown in FIG. 6C is configured as a combination of the AC/DC converter 202a shown in FIG. 6A and a DC/DC converter 202c having a fixed output. A selector 203 selects one from among the output voltage $V_{DC1}$ of the DC/DC converter 202c and the output voltage $V_{DC2}$ of the AC/DC converter 202a. The power supply side controller 204 controls the AC/DC converter 202a and the selector 203 so as to obtain the requested voltage.

The power supply circuit 202 shown in FIG. 6D has the same configuration as that shown in FIG. 6C except that the AC/DC converter 202a shown in FIG. 6C is replaced by the DC/DC converter 202b shown in FIG. 6B. The power supply side controller 204 controls the DC/DC converter 202b and the selector 203 so as to obtain the requested voltage.

[Usage]

Figure 7A:
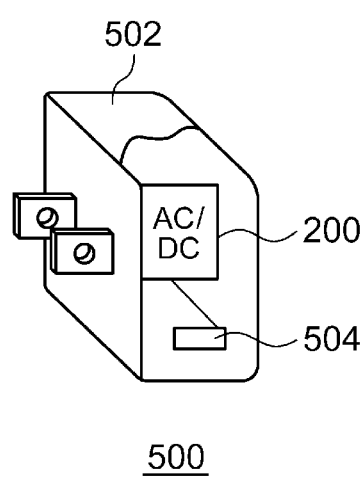
FIG. 7A is a perspective view of an AC adapter including a power supply apparatus.

Lastly, description will be made regarding the usage of the power supply apparatus 200. FIG. 7A is a perspective view of an AC adapter 500 including the power supply apparatus 200. The AC adapter 500 includes a housing 502, a receptacle 504, and the power supply apparatus 200. The power supply circuit 202 of the power supply apparatus 200 is configured as an AC/DC converter.

Figure 7B:
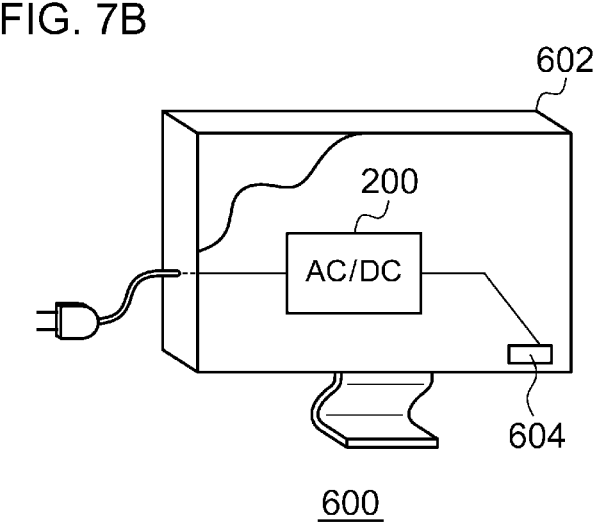
FIGS. 7B and 7C are perspective views each showing an electronic device including the power supply apparatus.

FIG. 7B is a perspective view of an electronic device 600 including the power supply apparatus 200. The electronic device 600 is configured as a device including no built-in battery, as with display apparatuses. The electronic device 600 includes a housing 602, a receptacle 604, and the power supply apparatus 200. The power supply circuit 202 of the power supply apparatus 200 is configured as an AC/DC converter.

Figure 7C:
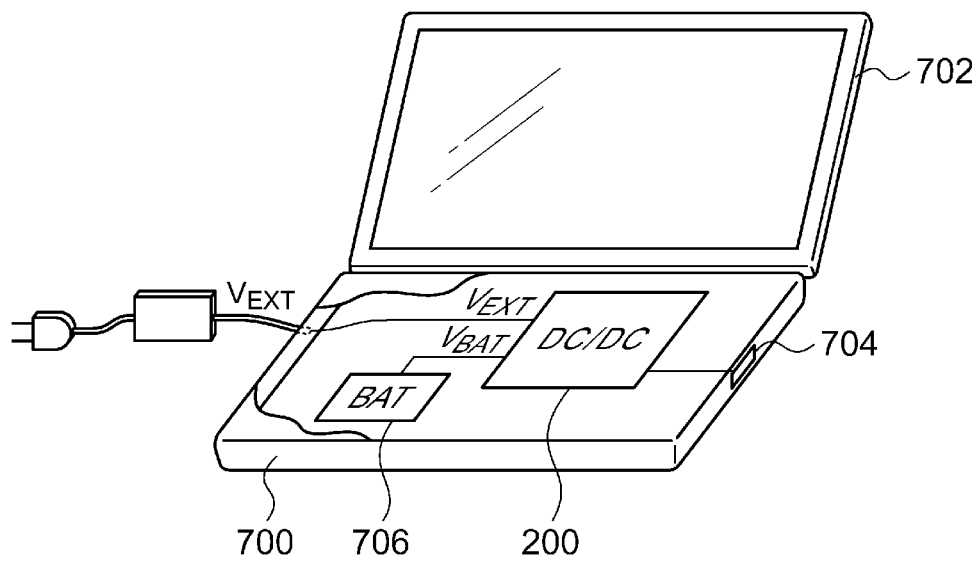

FIG. 7C is a perspective view of an electronic device 700 including the power supply apparatus 200. The electronic device 700 is configured as a device including a built-in battery, as with laptop PCs or tablet PCs. The electronic device 700 includes a housing 702, a receptacle 704, a battery 706, and the power supply apparatus 200. The power supply circuit 202 of the power supply apparatus 200 is configured as a DC/DC converter that receives a DC voltage $V_{BAT}$ from the battery 706 or otherwise a DC voltage $V_{EXT}$ from an external AC adapter 720, and that generates the bus voltage $V_{BUS}$.

As described above, the power supply apparatus 200 can be mounted on various kinds of electronic devices and AC adapters.

While the preferred embodiments of the present invention have been described using specific terms, such description is for illustrative purposes only, and it is to be understood that changes and variations may be made without departing from the spirit or scope of the appended claims.

What is claimed is:

1. A power supply method for supplying electric power from a power supply apparatus that conforms to a USB-PD specification to a power receiving apparatus, wherein the power supply apparatus is provided with a first list comprising data that defines an available voltage value and an available current value that can be supplied,
    wherein the power receiving apparatus is provided with a second list comprising data that defines a requested voltage value and a requested current value,
    and wherein the power supply method comprises:
    the power supply apparatus requesting the power receiving apparatus to transmit the requested voltage value;
    the power supply apparatus modifying the first list with reference to the requested voltage value and the first list, so as to include the requested voltage value when the requested voltage value is not defined in the first list in a case in which the power supply apparatus is capable of supplying a power supply voltage having the requested voltage value;
    the power supply apparatus transmitting the modified first list to the power receiving apparatus;
    the power receiving apparatus selecting one voltage value from the modified first list, and notifying the power supply apparatus of the selected voltage value; and
    the power supply apparatus supplying the power supply voltage having the selected voltage value to the power receiving apparatus,
    wherein the method further comprising, before requesting the transmission of the second list: the power supply apparatus transmitting the first list to the power receiving apparatus before modification;
    the power receiving apparatus selecting one voltage value from the unmodified first list, so as to notify the power supply apparatus of the selected voltage value; and
    the power supply apparatus supplying the power supply voltage having the selected voltage value.

2. A power supply apparatus that conforms to a USB-PD specification, structured to supply a bus voltage to a power receiving apparatus, the power supply apparatus comprising:
    a power supply circuit structured to generate the bus voltage that is a variable voltage;
    a first list comprising data that defines an available voltage value and an available current value that can be provided by means of the power supply circuit;
    a power supply side controller structured to communicate and negotiate with a power receiving side controller of the power receiving apparatus, to determine a voltage value to be supplied according to the first list, and to instruct the power supply circuit to generate the bus voltage having the determined voltage value; and
    a list modifying unit structured to request, by using a communication function of the power supply side controller, the power receiving side controller to transmit data comprising a requested voltage value, and to modify the first list so as to include the requested voltage value when the requested voltage value is not include in the first list in a case in which the power supply circuit is capable of generate the bus voltage having the requested voltage value,
    wherein, before the list modifying unit modifies the first list, the power supply side controller performs a first negotiation operation with the power receiving side controller so as to determine the voltage value to be supplied, and wherein, after the completion of the first negotiation operation, the list modifying unit requests the power receiving apparatus to transmit data including the requested voltage value.

3. The power supply apparatus according to claim 2, that conforms to the USB-PD specification.

4. The power supply apparatus according to claim 2, wherein the power supply circuit comprises a DC/DC converter structured so as to have a variable output voltage, and wherein the power supply side controller controls the output voltage of the DC/DC converter.

5. The power supply apparatus according to claim 2, wherein the power supply circuit comprises a plurality of DC/DC converters, and wherein the power supply side controller is structured to select one from among the plurality of DC/DC converters.

6. The power supply apparatus according to claim 2, wherein the power supply circuit comprises an AC/DC converter structured so as to have a variable output voltage, and wherein the power supply side controller controls the output voltage of the AC/DC converter.

7. An AC adapter comprising the power supply apparatus according to claim 2.

8. An electronic device comprising the power supply apparatus according to claim 2.

9. A control circuit for a power supply apparatus that conforms to a USB-PD specification, structured to supply a bus voltage to a power receiving apparatus, wherein the power supply apparatus comprises a power supply circuit structured to generate a variable bus voltage, in addition to the control circuit, and wherein the control circuit comprises:

memory structured to store a first list comprising data that defines an available voltage and an available current that can be supplied by the power supply circuit;

a power supply side controller structured to communicate with a power receiving side controller of the power receiving apparatus, to determine a voltage value to be supplied by means of negotiation using the first list, and to instruct the power supply circuit to generate the bus voltage having the determined voltage value; and a list modifying unit structured to request, by using a communication function of the power supply side controller, the power receiving side controller to transmit data inducing a requested voltage value, and to modify the first list so as to include the requested voltage value when the requested voltage is not defined in the first list in a case in which the power supply circuit is capable of supplying the bus voltage having the requested voltage value, wherein, before the list modifying unit modifies the first list, the power supply side controller performs a first negotiation operation with the power receiving side controller so as to determine the voltage value to be supplied, and wherein, after the completion of the first negotiation operation, the list modifying unit requests the power receiving apparatus to transmit data including the requested voltage value.

10. The control circuit according to claim 9, monolithically integrated on a single semiconductor substrate.

* * * * *